(12) United States Patent
Mathon et al.

(10) Patent No.: US 8,916,076 B2
(45) Date of Patent: Dec. 23, 2014

(54) PRESSURE MAINTAINING DEVICE FOR CREATING COMPOSITE COMPONENTS BY INJECTING RESIN AND ASSOCIATED METHOD

(75) Inventors: Richard Mathon, New Castle, NH (US); Antoine Phelippeau, Portsmouth, NH (US)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/122,532

(22) PCT Filed: May 25, 2012

(86) PCT No.: PCT/FR2012/051186
§ 371 (c)(1),
(2), (4) Date: Nov. 26, 2013

(87) PCT Pub. No.: WO2012/168623
PCT Pub. Date: Dec. 13, 2012

(65) Prior Publication Data
US 2014/0197582 A1    Jul. 17, 2014

(30) Foreign Application Priority Data
May 27, 2011 (FR) .................................... 11 54662

(51) Int. Cl.
*B29C 45/56* (2006.01)
*B29C 45/18* (2006.01)
*B29C 70/48* (2006.01)

(52) U.S. Cl.
CPC ............... *B29C 45/18* (2013.01); *B29C 70/48* (2013.01)
USPC ........................ 264/257; 264/571; 425/546

(58) Field of Classification Search
USPC ..................... 264/571, 257, 258; 425/546
See application file for complete search history.

(56) References Cited

U.S. PATENT DOCUMENTS 7,939,011 B2 * 5/2011 Young ........................ 264/571
2004/0219244 A1 * 11/2004 Filsinger et al. ............. 425/116

FOREIGN PATENT DOCUMENTS

| DE | 196 30 840 | 2/1998 |
| GB | 989 124 | 4/1965 |
| WO | WO 97/48546 | 12/1997 |
| WO | WO 2007/054315 | 5/2007 |

OTHER PUBLICATIONS

International Search Report as issued for International Application No. PCT/FR2012/051186, dated Oct. 23, 2012.

* cited by examiner

*Primary Examiner* — Jill Heitbrink
(74) *Attorney, Agent, or Firm* — Pillsbury Winthrop Shaw Pittman LLP

(57) ABSTRACT

A pressure maintaining device for a resin injecting system, including a first chamber that can be connected to a pressurizing device and is able to be connected to a vacuum generating device; a second chamber that can be connected to a resin injection network of the injection system by a resin injection pipe and a resin outlet pipe, the first chamber and the second chamber being arranged so that the one is unable to leak into the other; a flexible body able to transmit pressurizing of the first chamber to the second chamber so as to apply pressure to the injection network of the injection system; a perforated rigid plate able to limit the deformation of the flexible body when the vacuum is created in the first chamber.

11 Claims, 3 Drawing Sheets

PRESSURE MAINTAINING DEVICE FOR CREATING COMPOSITE COMPONENTS BY INJECTING RESIN AND ASSOCIATED METHOD

CROSS-REFERENCE TO RELATED APPLICATIONS

This is the U.S. National Stage of PCT/FR2012/051186, filed May 25, 2012, which in turn claims priority to French Patent Application No. 1154662, filed May 27, 2011, the entire contents of all applications are incorporated herein by reference in their entireties.

The present invention relates to a pressure maintaining device for making composite parts produced by RTM (resin transfer moulding) injection as well as a method for creating a component made of composite materials by RTM injection.

The invention is particularly applicable to the aeronautics field.

The RTM method is a known method for creating parts made of composite materials (fibre-resin) with high strength to mass ratio. In a conventional manner, the RTM method comprises the following fundamental operations:
preparing a fibre preform by weaving;
arranging the preform in an injection mould;
injecting the resin in the liquid state;
applying a maintaining pressure on the injected resin and polymerising the component by heating.

The resins used are very fluid so as to penetrate well between the different fibres of the preform, even when they are injected under a reduced pressure. During polymerisation under the effect of heat, the injected resin passes successively from the liquid state to the gelified state and finally to the solid state.

In order to guarantee high quality components, without defects and without porosity, particularly due to the phenomenon of degassing of the resin during polymerisation, it is necessary to maintain the maintaining pressure up to the complete polymerisation of the component.

In known RTM injection systems, the pressurizing is assured by the resin injector. It is then necessary to maintain the injector in place and to maintain a pressure up to the complete solidification of the resin. Thus, these RTM injection systems do not make it possible to create components at high rates, since the immobilisation time of the injector is indexed to that of the polymerisation of the resin. The occupancy time of the production means are consequently important and non-compressible.

In addition, the maintaining in place of the injection device, up to the complete polymerisation of the component, increases the risk of polymerisation of the resin inside the injection device and inside pipes situated between the injection device and the mould, which renders complex the operations of cleaning of the injection device.

Finally, during the use of an oven as heating means, the resin contained in the pipe comprised between the injection device and the mould may be brought about to polymerize before the resin contained in the mould in which the resin thickness is greater. This solidification in the pipe thus no longer makes it possible to assure the transmission of the maintaining pressure up to the mould, which leads to the presence of porosity in the component.

In this context, the invention aims to resolve the aforementioned problems by proposing a pressure maintaining device for the production of components made of composite materials by RIM injection.

To this end, the invention proposes a pressure maintaining device for a resin injection system characterised in that it comprises:
a first chamber able to be connected to pressurizing means and able to be connected to vacuum means:
a second chamber that can be connected to a resin injection network of the injection system by means of a resin injection pipe and of a resin outlet pipe, said first chamber and said second chamber being arranged so that the one is unable to leak into the other;
a flexible body able to transmit pressurizing of said first chamber to said second chamber so as to apply pressure to said injection network of the injection system;
a perforated rigid plate able to limit the deformation of said body when said vacuum is created in said first chamber.

Thanks to the invention, it is no longer necessary to maintain a maintaining pressure in the resin injection system via the injector. Thus, the injector is freed as of the end of the injection, which makes it possible to avoid the polymerisation of the resin inside the injector during the pressure maintaining phase. The occupancy time of the injector is also reduced making it possible to increase thereby the rate of production per injector.

Thanks to the invention, the deformation of the flexible body during the creation of a vacuum in the injection system is limited, or even eliminated, by the presence of a perforated rigid plate allowing air to pass. The perforated rigid plate thus makes it possible to assure the functioning of the creation of a vacuum in the system while being free of any risk of plugging of the pipes by deformation of the flexible body.

The pressure maintaining device according to the invention may also have one or more of the characteristics below, considered individually or according to any technically possible combinations thereof:
said first chamber is able to receive pressurized air;
said flexible body is an elastomeric membrane.

The subject matter of the invention is also a resin injection system able to create components made of composite materials comprising:
a resin injector;
an injection mould comprising a cavity able to receive a woven preform;
a resin injection network formed by a resin inlet pipe connecting the resin injector and said injection mould and a resin outlet pipe able to discharge the surplus of resin injected into said cavity;
a pressure maintaining device according to the invention;
means for creating a vacuum in said injection system;
means for creating a vacuum in and/or pressurizing the first chamber of the pressure maintaining device.

The resin injection system able to create components made of composite materials according to the invention may also have one or more of the characteristics below, considered individually or according to any technically possible combinations thereof:
said pressure maintaining device is positioned at the level of said resin inlet pipe or at the level of said resin outlet pipe;
said pressure maintaining device is arranged inside said injection mould;
said pressure maintaining device is arranged inside said injection mould so that said second chamber of said device communicates with said cavity of said injection mould;

said pressure maintaining device is arranged inside said injection mould so that said second chamber is in contact with said preform present in said cavity;

said pressure maintaining device and/or said resin inlet pipe are insulated.

The subject matter of the invention is also a method of injecting resin by RTM implemented by means of an injection system according to the invention characterised in that said method comprises the steps consisting in:

creating a vacuum in said first chamber of said pressure maintaining device;

creating a vacuum in said resin injection network formed at least of said resin inlet pipe, said resin outlet pipe, said cavity of said injection mould, via said means able to create a vacuum in the injection system;

injecting the resin in the liquid state into the injection network by means of said injector so as to reach a set pressure inside said injection mould:

applying a maintaining pressure in the injection network by means of said pressure maintaining device up to the polymerisation of said resin.

According to an advantageous embodiment, said first chamber is simultaneously pressurized during the injection of said resin, said pressurizing being carried out such that the pressure inside said first chamber remains below said pressure present inside said injection network.

Other characteristics and advantages of the invention will become clearer from the description that is given thereof below, by way of indication and in no way limiting, with reference to the appended figures, among which:

In all the figures, common elements bear the same reference numbers unless stated otherwise.

FIG. 1 is a schematic view illustrating a first embodiment of an RTM injection system 100 incorporating a pressure maintaining device 10 according to the invention.

Figure 1:
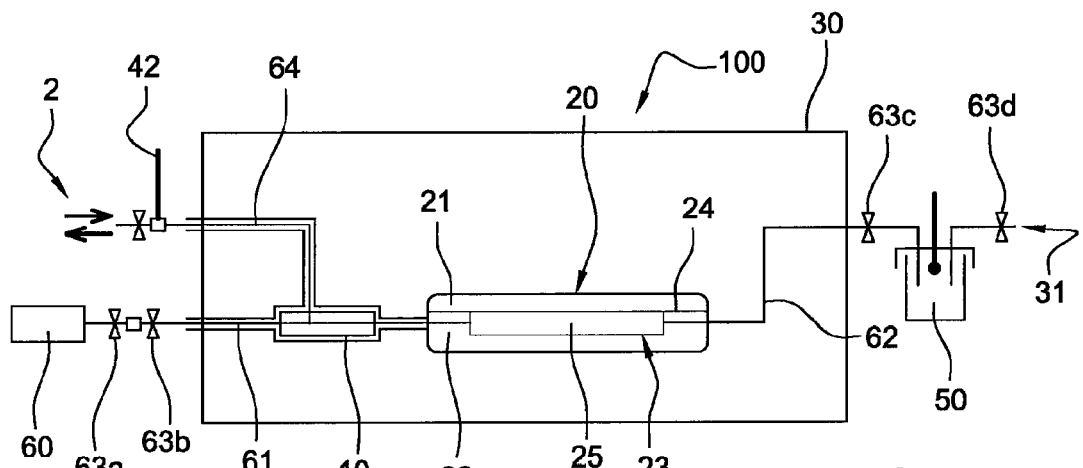
FIG. 1 is a schematic view illustrating a first embodiment of an RTM injection system incorporating a pressure maintaining device according to the invention.

The system 100 comprises conventional elements making it possible to create a component made of composite materials by RTM injection. To this end, the system 100 comprises:

a resin injector 60;

an injection mould 20 in two parts constituted of an upper part 21 and a lower part 22, separated by a join surface 24 and comprising a cavity 23 with the shape of the component to be created into which is inserted a woven preform 25;

a resin trap 50;

an injection pipe 61 connecting the injector 60 to the injection mould 20;

a resin outlet pipe 62 connecting the injection mould 20 to the resin trap 50;

means 31 for creating a vacuum in the injection system 100;

opening/closing valves 63a, 63b, 63c, 63d making it possible to control the opening or the closing of the different pipes 61, 62 of the system 100;

means 30 for heating the injection mould 20, such as for example an oven, so as to accelerate the polymerisation.

Thus, in a conventional manner, the creation of a component made of composite materials by RTM may be broken down into a plurality of successive steps consisting in:

preparing the injection mould 20 by the application of a mould release agent;

preparing a fibre preform 25 formed beforehand by weaving;

putting in place the woven preform 25 in the cavity 23 of the injection mould 20;

closing the injection mould 20 and preparing the resin injection 61 and outlet 62 pipes;

heating the injection mould 20 in an oven or under a hot press;

creating a vacuum in the pipe network 61, 62 as well as the cavity 23 of the injection mould 20 by the means 31 able to create a vacuum in the injection system 100;

injecting the resin in the liquid state into the injection pipe 61 by means of the injector 60 such that the resin migrates into the injection pipe 61 to the cavity 23 of the injection mould 20 then to the resin outlet pipe 62 when the cavity 23 is filled, the surplus of injected resin being recovered in the resin trap 50; the woven preform is then impregnated with resin;

applying a maintaining pressure on the injected resin at the end of the filling of the cavity 23 up to the polymerisation of the resin so as to continue the impregnation of the woven preform 25 and to reduce the porosity of the component;

removing the created component from the mould.

The injection system 100 further comprises a pressure maintaining device 10 making it possible to apply the maintaining pressure on the resin required to create a quality component.

According to the first embodiment illustrated in FIG. 1, the pressure maintaining device 10 is independent of the injection mould 20 and is positioned on the injection pipe 61 between the injector 60 and the injection mould 20.

In FIG. 1, the pressure maintaining device 10 is advantageously placed in the oven and near to the injection mould 20; nevertheless, the device 10 may also be placed outside of the oven.

The pressure maintaining device 10 is also connected, by means of the pipe 64, to a network able to inject pressurized air or to draw a vacuum without the pipe 64.

Figure 2:
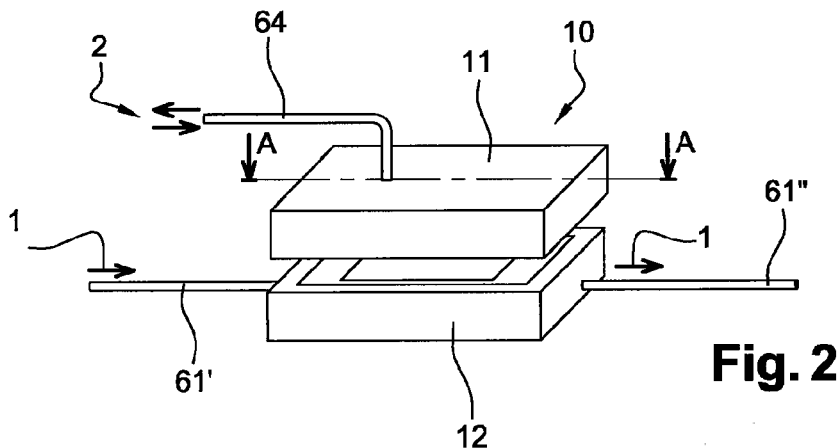
FIG. 2 is a perspective view of the pressure maintaining device according to the first embodiment illustrated in FIG. 1.
Figure 3:
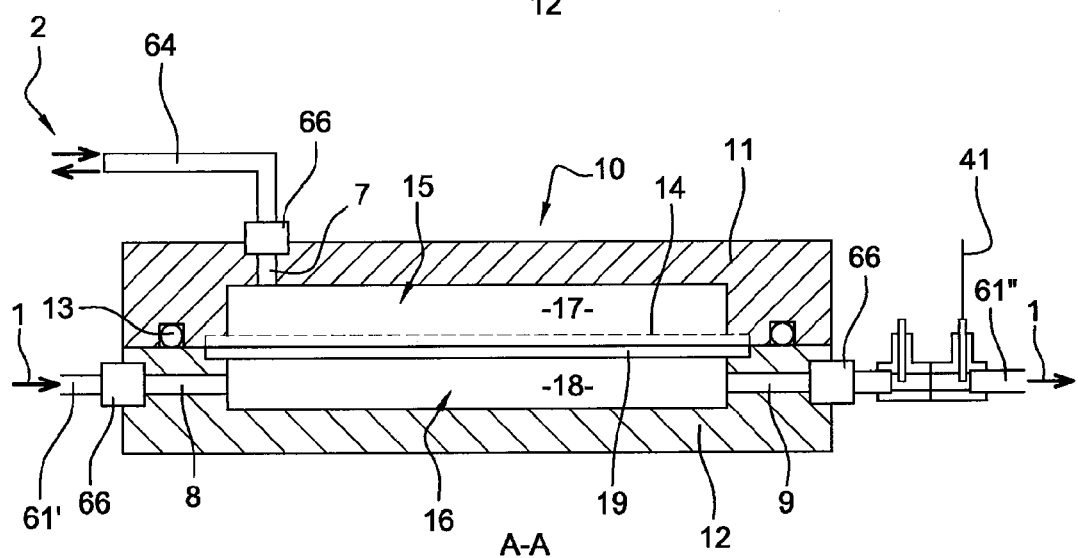
FIG. 3 is a sectional view, along the cut plane A-A, of the pressure maintaining device illustrated in FIG. 2.

The device 10 is illustrated in a more precise manner in FIGS. 2 and 3. FIG. 2 illustrates a perspective view of the pressure maintaining device 10 in open position and FIG. 3 is a sectional view, along the cut plane A-A, of the pressure maintaining device in closed position.

The pressure maintaining device 10 is formed of an upper part 11 and a lower part 12 maintained assembled for example by screwing means. The upper part 11 comprises a cavity 15 delimiting a first chamber 17, referred to as air chamber, and in a similar manner, the lower part 12 comprises a cavity 16 delimiting a second chamber 18, referred to as resin chamber.

The two chambers 17 and 18 are separated by a flexible body 19 and means 14 able to limit the deformation of the flexible body 19 during the creation of a vacuum in the pipe network, and particularly the first chamber 17.

The sealing between two chambers 17 and 18 is assured during the closing of the device 10 by pinching the ends of the flexible body 19.

The means 14 able to limit the deformation of the flexible body are for example a perforated sheet 14, advantageously a stainless steel sheet comprising a plurality of through orifices of several millimeters diameter, typically of the order of 2 to 3 mm. The orifices of the perforated sheet 14 thus allow air to pass through it, particularly during the phases of creating a vacuum and pressurizing the injection system.

The flexible body 19 is advantageously an elastic membrane, for example an airtight membrane able to transmit pressure and to withstand high temperatures (i.e. temperatures above 180° C.). Advantageously, the membrane 19 is an elastomeric membrane of silicone type of several millimeters thickness.

An additional seal 13 makes it possible to assure the sealing between the chambers 17, 18 and the exterior of the device 10.

The resin chamber 18, intended to receive the resin during the injection, communicates upstream with a first conduit 8 connected by a connecting element 66 to a first portion 61' of the injection pipe 61 and downstream with a second conduit 9 also connected by a connecting element 66 to a second portion 61" of the injection pipe 61.

The air chamber 17 communicates in its upper part with an air supply conduit 7 connected by a connecting element 66 to the pipe 64.

The connecting elements 66 are advantageously means making it possible to connect and to disconnect rapidly the pipes 61', 61", 64.

In FIGS. 2 and 3, the arrows referenced 1 represent the direction of migration of the resin inside the device 10 and the arrows referenced 2 represent two directions of circulation of air in the pipe 64 (i.e. during the creation of a vacuum in the air chamber 17 and during the pressurization of the air chamber 17).

The use of the pressure maintaining device 10 modifies all of the steps of the known RTM injection method as described previously.

Thus, during the step of creating a vacuum in the pipe network 61, 62 as well as the cavity 23 of the injection mould 20 by the means 31, it is also necessary to create a vacuum in the air chamber 17 via the pipe 64 in order to avoid any excessive deformation of the elastic membrane 19 during this operation. In fact, without creating a vacuum in the air chamber 17, making it possible to press the membrane 19 against the perforated sheet 14, the membrane 19 would risk being sucked into the resin chamber 18 and obstruct one of the conduits 8, 9 thereby preventing the creation of a vacuum in the system 100 and particularly between the pressure maintaining device and the injector 60.

At the start of the injection of resin into the injection pipe 61, when the network of pipes is still under vacuum, the air chamber 17 is maintained under vacuum in order to maintain the elastic membrane 19 pressed against the perforated sheet 14. The resin is thus going to begin to migrate into the pipe 61 then into the device 10 through suction.

When the pressure in the injection network (i.e. in the assembly formed by the pipe 61, the resin chamber 18 of the device 10, the cavity 23 of the injection mould 20 and by the resin outlet pipe 62) exceeds a threshold value (typically above atmospheric pressure) the air chamber 17 can begin to be pressurized. To this end, pressurized air is injected into the pipe 64 so as to pressurize the air chamber 17.

Advantageously, the pressure of the injection network is determined by means of a pressure sensor 41 positioned at the outlet of the device 10 on the portion 61" of the pipe 61.

So as to avoid a degradation of the elastic membrane 19, it is necessary to pressurize in a progressive manner the air chamber 17 during the step of injecting the resin. In addition, the creation of a pressure differential between the pressure of the air chamber 17 and the pressure present in the resin chamber 18 of the injection network makes it possible to guarantee the maintaining of the elastic membrane 19 against the perforated sheet 14. Thus, for example, it is advisable to maintain a relative pressure in the air chamber 17 below 0.5 bars compared to the pressure of the resin chamber 18. To do this, a vacuum/pressure sensor 42 is positioned on the pipe 64.

At the end of the step of injecting the resin, in other words when the injection mould 20 is filled with resin and when the maintaining pressure in the mould has reached its set value, the injector 60 can be isolated from the injection network by closing the valves 63a and 63b then by its disconnection at the level of the connecting element 66.

The pressure maintaining device 10 then takes up the relay by the pressurization of the air chamber 17. The pressure of the air chamber 17 is then transmitted to the resin chamber 18 and to the injection mould via the elastic membrane 19 which deforms and presses on the resin present in the resin chamber 18. Thus, the pressure maintaining device makes it possible to guarantee a maintaining pressure in the injection mould up to the complete polymerisation of the component.

The injector being isolated as of the end of the injection step, it can be easily cleaned since the resin has not yet polymerised and may also be used to inject the resin into a second injection system, parallel to the first, even though the polymerisation of the component of the first system has not yet ended.

So as to delay the solidification of the resin and to enable the transmission of the pressure in the injection mould as long as possible, the pressure maintaining device 10 and the portion 61" of the pipe 61 comprised between the device 10 and the injection mould 20 are fully insulated.

Thus, in the case of heating in an oven, this will enable the resin to avoid polymerising in the device 10 and in the pipe 61" during the increase in temperature.

In the case of an injection under a press, this makes it possible to avoid the solidification or the thickening of the resin by cooling on contact with the air in the device 10 and in the pipe 61".

Figure 4:
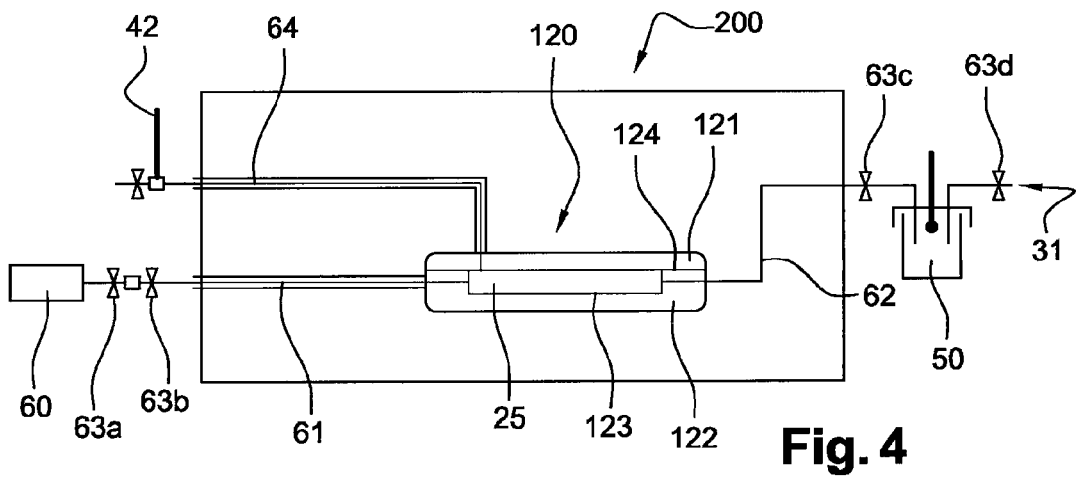
FIG. 4 is a schematic view illustrating a second embodiment of an RTM injection system incorporating a pressure maintaining device according to the invention.
Figure 5:
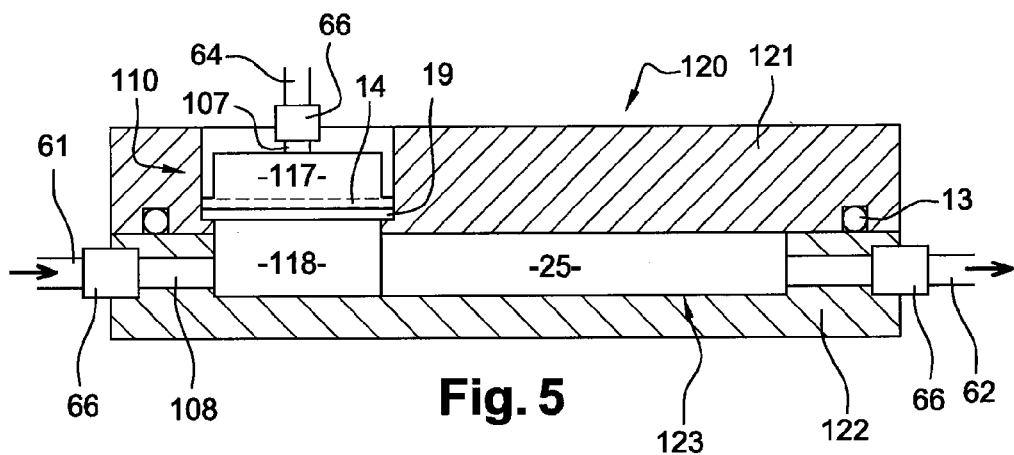
FIG. 5 is a sectional view of the injection mould illustrated in FIG. 4 during the resin injection phase.
Figure 6:
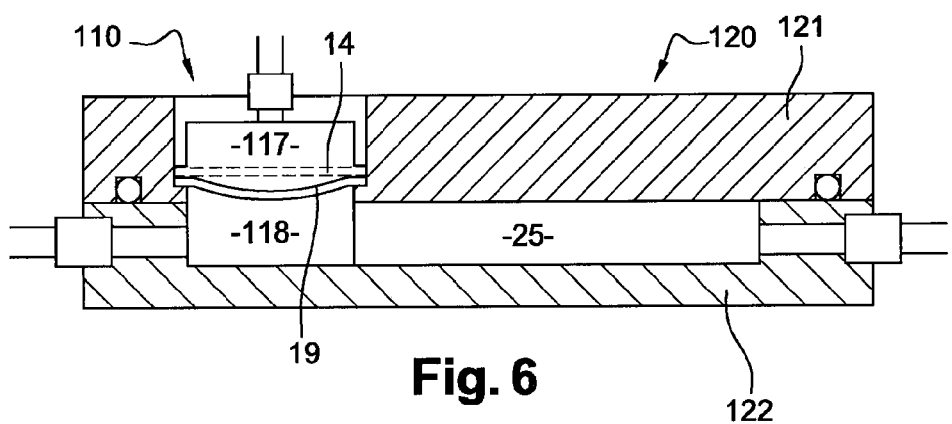
FIG. 6 is a sectional view of the injection mould illustrated in FIG. 4 during the maintaining at pressure of the injection system during the polymerisation of the component.

FIGS. 4, 5, and 6 illustrate a second embodiment of the invention. In this second embodiment, the pressure maintaining device is inserted into the injection mould 120.

FIG. 4 illustrates more particularly the injection system 200 overall and FIGS. 5 and 6 illustrate a sectional view of the injection mould 120 incorporating the pressure maintaining device 110 during the resin injection phase (FIG. 5) and during the maintaining at pressure of the injection system during the polymerisation of the component (FIG. 6).

The injection system 200 is similar to the injection system 100 described previously and common elements bear the same references.

On the other hand, the injection system 200 differs from the injection system 100 by the injection mould 120.

The injection mould 120 is a mould in two parts, an upper part 121 and a lower part 122, separated by a join surface 124 and comprising a cavity 123 having the shape of the component to be created in which is inserted a woven preform 125.

The lower part 122, in which is arranged the cavity 123, communicates upstream with the injection pipe 61 connected to the lower part 122 by a connecting element 66 and downstream with the resin outlet pipe 62 connected to the lower part 122 by a second connecting element 66.

In a similar manner to the description given previously, the pressure maintaining device 110 is constituted of an air chamber 117 and a resin chamber 118. The air chamber 117 is formed by a cavity arranged inside the upper part 121 of the injection mould 120. The air chamber 117 communicates in its upper part with an air supply conduit 107 connected by a connecting element 66 to the pipe 64.

The resin chamber 118 is mainly arranged in the lower part 122 of the injection mould 120 so as to communicate with the cavity 23.

The resin chamber 118 of the maintaining device 110 is advantageously placed upstream of the cavity 123; nevertheless, it is also possible to position the maintaining device 110 so that the resin chamber 118 is positioned downstream of the cavity 123.

The resin chamber 118 communicates upstream with a first conduit 108 connected to the injection pipe 61 and downstream with the cavity 123.

In a similar manner to the description of the first embodiment, a vacuum is created in the air chamber 117, during the creation of a vacuum in the injection system 200, so as to maintain the membrane 19 pressed against the perforated sheet 14.

At the end of the step of injecting the resin illustrated in FIG. 6, the pressure maintaining device 110 then takes up the relay by pressurization of the air chamber 117. The pressure of the air chamber 117 is then transmitted to the resin chamber 118 and to the cavity 23 via the elastic membrane 19 which deforms and presses on the resin present in the resin chamber 118. Thus, the pressure maintaining device makes it possible to guarantee the maintaining pressure in the injection mould 120 up to the complete polymerisation of the component.

Figure 7:
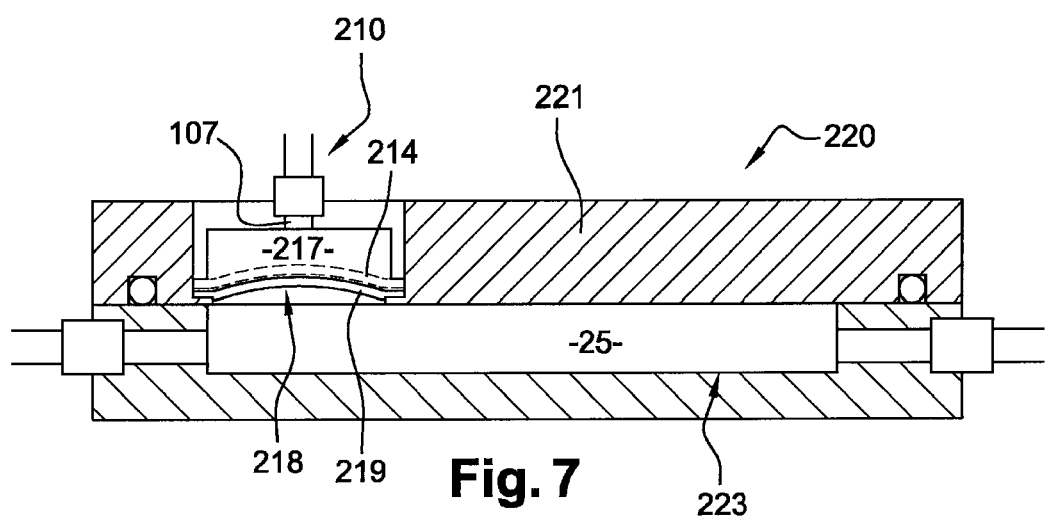
FIG. 7 is a schematic view illustrating a third embodiment of an injection mould incorporating a pressure maintaining device according to the invention, during the phase of injection of the resin.
Figure 8:
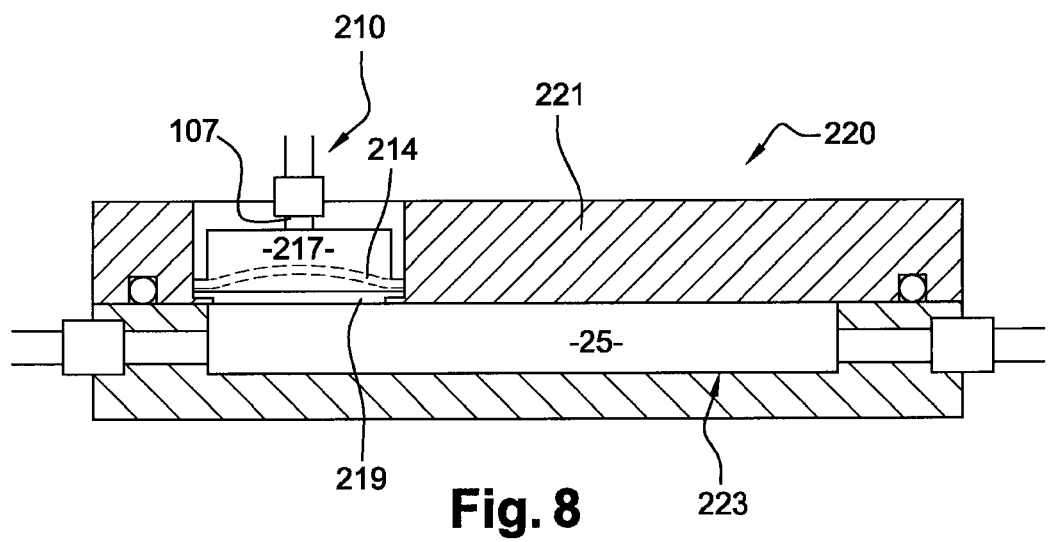
FIG. 8 is a schematic view illustrating a third embodiment of an injection mould incorporating a pressure maintaining device according to the invention, during the maintaining at pressure of the injection system during the polymerisation of the component.

FIGS. 7 and 8 illustrate a third embodiment of the invention. In this third embodiment, the pressure maintaining device 210 is incorporated in the injection mould 220 in contact with the preform 25.

In this third embodiment, the pressure maintaining device 210 is arranged so that the resin chamber 218 is situated above the cavity 223 and in contact with the preform 25.

In a similar manner to the preceding embodiment illustrated in FIGS. 4, 5, 6, the air chamber 217 is formed by a cavity arranged inside the upper part 221 of the injection mould 220. The air chamber 117 communicates in its upper part with an air supply conduit 107 connected by a connecting element 66 to the pipe 64.

This third embodiment is used in the case where the geometric criteria of the component are sufficiently tolerant to allow a localised shape defect. Advantageously, the pressure maintaining device is located at one of the ends of the preform which will be subsequently scrapped.

Thus, according to the advantageous embodiment illustrated in FIGS. 7 and 8, the perforated sheet 214 comprises a suitable shape, advantageously in an arc of circle, the convexity of which is oriented towards the air chamber 217, so as to create a resin chamber 218 between the preform 25 and the elastic membrane 219. This volume of resin between the membrane 219 and the preform 25 will diffuse into the preform during the pressurization step (FIG. 8), which will make it possible to be free of any risk of over-compacting the resin during this step.

According to a variant of this embodiment, the elastic membrane 219 can be directly in contact with the preform 25. In this situation, the resin chamber is constituted of the cavity 23 of the injection mould 220 filled with resin during the injection.

Generally speaking, the volume of resin to take into account to define the volume of the resin chamber is dependent on the total volume of resin injected into the component. Thus, as an example, the volume of the resin chamber is greater than or equal to 5% of the total volume of the injected resin. This resin volume mainly corresponds to the residual injection volume that the preform is still capable of absorbing at the end of injection even though the maintaining pressure has already reached its nominal value and the injection rate is close to zero. This injection, referred to as residual injection, physically corresponds to the filling of the final inter and intra-strand spaces of the woven preform.

The invention has been particularly described with a flexible elastic membrane for the transmission of pressure in the injection device; nevertheless the transmission of pressure in the pressure maintaining device may also be a rigid membrane, a piston or instead any ad hoc means making it possible to transmit pressure.

The invention has been particularly described by positioning the pressure maintaining device at the level of the injection pipes or resin inlet of the injection mould; nevertheless the invention is also applicable by positioning the pressure maintaining device at the level of the resin outlet pipes.

The invention claimed is:

1. Pressure maintaining device of a resin injection system comprising:
    a first chamber able to be connected to a pressurizing device and able to be connected to a vacuum generating device;
    a second chamber to be connected to a resin injection network of the injection system by a resin injection pipe and a resin outlet pipe, said first chamber and said second chamber being arranged so that the one is unable to leak into the other;
    a flexible body able to transmit pressurizing of said first chamber to said second chamber so as to apply pressure to said injection network of the injection system;
    a perforated rigid plate able to limit deformation of said flexible body when said vacuum is created in said first chamber.

2. Pressure maintaining device of a resin injecting system according to claim 1, wherein said first chamber is able to receive pressurized air.

3. Pressure maintaining device of a resin injection system according to claim 1, wherein said flexible body is an elastomeric membrane.

4. Resin injection system able to create components made of composite materials comprising:
    a resin injector;
    an injection mould comprising a cavity able to receive a woven preform;
    a resin injection network formed by a resin inlet pipe connecting the resin injector and said injection mould and a resin outlet pipe able to evacuate the surplus of resin injected into said cavity;
    a pressure maintaining device according to claim 1;
    a vacuum generating device to create a vacuum in said injection system;
    a device to create a vacuum in and/or to pressurize the first chamber of the pressure maintaining device.

5. Resin injection system according to claim 4, wherein said pressure maintaining device is positioned at the level of said resin inlet pipe or at the level of said resin outlet pipe.

6. Resin injection system according to claim 4, wherein said pressure maintaining device is arranged inside said injection mould.

7. Resin injection system according to claim 6, wherein said pressure maintaining device is arranged inside said injection mould such that said second chamber of said device communicates with said cavity of said injection mould.

8. Resin injection system according to claim 6, wherein said pressure maintaining device is arranged inside said injection mould such that said second chamber is in contact with said preform present in said cavity.

9. Resin injection system according to claim 4, wherein said pressure maintaining device and/or said resin inlet pipe are insulated.

10. Method of injecting resin by RTM implemented by means of an injection system according to claim 4, said method comprising:

creating a vacuum in said first chamber of said pressure maintaining device;

creating a vacuum in said resin injection network formed at least of said resin inlet pipe, said resin outlet pipe, said cavity of said injection mould, via said vacuum generating device able to create a vacuum in the injection system;

injecting the resin in the liquid state into the injection network by means of said injector so as to reach a set pressure inside said injection mould;

applying a maintaining pressure in the injection network by said pressure maintaining device up to the polymerisation of said resin.

11. Method of injecting resin by RTM according to claim 10, wherein said first chamber is simultaneously pressurized during the injection of said resin, said pressurization being carried out so that the pressure inside said first chamber remains below said pressure present inside said injection network.

* * * * *